(12) United States Patent
Li et al.

(10) Patent No.: US 12,058,618 B2
(45) Date of Patent: Aug. 6, 2024

(54) METHOD AND APPARATUS FOR WAKE-UP SIGNALS

(71) Applicant: LENOVO (BEIJING) LIMITED, Beijing (CN)

(72) Inventors: Yingying Li, Beijing (CN); Zhi Yan, Beijing (CN); Haipeng Lei, Beijing (CN); Hongmei Liu, Beijing (CN); Haiming Wang, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 100 days.

(21) Appl. No.: 17/280,032

(22) PCT Filed: Nov. 12, 2018

(86) PCT No.: PCT/CN2018/115073
§ 371 (c)(1),
(2) Date: Mar. 25, 2021

(87) PCT Pub. No.: WO2020/097764
PCT Pub. Date: May 22, 2020

(65) Prior Publication Data
US 2021/0345245 A1    Nov. 4, 2021

(51) Int. Cl.
*H04W 52/02* (2009.01)
*H04W 4/70* (2018.01)
*H04W 68/00* (2009.01)

(52) U.S. Cl.
CPC ... *H04W 52/0219* (2013.01); *H04W 52/0235* (2013.01); *H04W 68/005* (2013.01); *H04W 4/70* (2018.02)

(58) Field of Classification Search
None
See application file for complete search history.

(56) References Cited

U.S. PATENT DOCUMENTS 6,577,608 B1 * 6/2003 Moon ............... H04B 1/707
455/343.1
7,711,377 B2 * 5/2010 Laroia ............... H04W 68/025
370/335

(Continued)

FOREIGN PATENT DOCUMENTS

CN    101145829 A    3/2008
CN    105519202 A    4/2016

(Continued)

OTHER PUBLICATIONS

NTT Docomo, Inc., Discussion on UE-group wake up signal in NB-Iot, 3GPP TSG RAN WG1 Meeting #95, R1-1813294, Nov. 12-16, 2018, pp. 1-4, Spokane, USA.

(Continued)

*Primary Examiner* — Khaled M Kassim
*Assistant Examiner* — Berhanu D Belete
(74) *Attorney, Agent, or Firm* — Kunzler Bean & Adamson

(57) ABSTRACT

Method and apparatus for UE group wake up signals are disclosed. The apparatus includes a processor that determines a first time slot (w0) and a first frequency location for a first wake up signal; and a transmitter that transmits the first wake up signal starting from the first time slot (w0) and the first frequency location; wherein the first wake up signal is associated with a paging message and ends at a second time slot minus one (g0−1) with a first maximal duration; wherein a first time offset of the second time slot (g0) and a start of a time slot of the paging message is determined by at least one of: a second time offset of the second time slot to a third time slot for a second wake up signal, a second maximal duration of the second wake up signal, a presence of the second wake up signal, and a paged group number (Continued)

associated with the paging message; wherein the transmitter further transmits the paging message.

20 Claims, 7 Drawing Sheets

(56) References Cited

U.S. PATENT DOCUMENTS

| | | | | |
|---|---|---|---|---|
| 11,272,451 | B2* | 3/2022 | Liu | H04L 5/00 |
| 11,284,372 | B2* | 3/2022 | Cox | H04W 52/0235 |
| 2004/0209628 | A1* | 10/2004 | Laroia | H04W 68/02 |
| | | | | 455/458 |
| 2010/0178942 | A1* | 7/2010 | Laroia | H04W 68/025 |
| | | | | 455/458 |
| 2010/0190514 | A1* | 7/2010 | Laroia | H04W 68/025 |
| | | | | 455/458 |
| 2011/0316676 | A1* | 12/2011 | Bajic | G06K 7/0008 |
| | | | | 340/10.33 |
| 2017/0163331 | A1* | 6/2017 | Breiling | H04B 7/15542 |
| 2019/0200296 | A1* | 6/2019 | Liu | H04W 52/0229 |
| 2019/0312758 | A1* | 10/2019 | Liu | H04W 52/0216 |
| 2019/0349856 | A1* | 11/2019 | Liu | H04W 52/0216 |
| 2020/0029302 | A1* | 1/2020 | Cox | H04W 52/0216 |
| 2021/0007054 | A1* | 1/2021 | Jiang | H04W 52/0216 |
| 2021/0037469 | A1* | 2/2021 | Åström | H04W 68/005 |
| 2021/0136687 | A1* | 5/2021 | Liu | H04W 72/00 |

FOREIGN PATENT DOCUMENTS

| | | | | |
|---|---|---|---|---|
| WO | 2018204799 | A1 | 11/2018 | |
| WO | WO-2019033112 | A1 * | 2/2019 | H04W 4/70 |

OTHER PUBLICATIONS

Nokia, Nokia Shanghai Bell, UE-group wake-up signal NB-Iot, 3GPP TSG RAN WG1 Meeting #95, R1-1812928, Nov. 12-16, 2018, pp. 1-5, Spokane, USA.

Ericsson, Downlink channel power efficiency for MTC, 3GPP TSG-RAN WG1 Meeting #92, R1-1801483, Feb. 26-Mar. 2, 2018, pp. 1-14, Athens, Greece.

International Searching Authority, "Notification of Transmittal of the International Search Report and the Written Opinion of the International Searching Authority, or the Declaration", PCT/CN2018/115073, Nov. 12, 2018, pp. 1-6.

3GPP, 3rd Generation Partnership Project; Technical Specification Group Radio Access Network; Downlink channel power efficiency for MTC, 3GPP R1-1801483, Feb.-Mar. 2018, pp. 1-13.

3GPP, 3rd Generation Partnership Project; Technical Specification Group Radio Access Network; eMTC power consumption reduction for paging and connected-mode DRX , 3GPP R2-1708285, Aug. 2017, pp. 1-8.

* cited by examiner

METHOD AND APPARATUS FOR WAKE-UP SIGNALS

FIELD

The subject matter disclosed herein relates generally to wireless communication and more particularly relates to transmission and reception of wake up signals.

BACKGROUND

The following abbreviations and acronyms are herewith defined, at least some of which are referred to within the following description.

Third Generation Partnership Project ("3GPP"), Downlink ("DL"), Evolved Node B ("eNB"), 5G Node B ("gNB"), Frequency-Division Multiplexing ("FDM"), Hybrid Automatic Repeat Request ("HARQ"), Hybrid Automatic Repeat Request-Positive Acknowledgement ("HARQ-ACK"), Hybrid Automatic Repeat Request-Negative Acknowledgement ("HARQ-NACK"), Long Term Evolution ("LTE"), LTE Advanced ("LTE-A"), Machine Type Communication ("MTC"), MTC physical downlink control channel ("MPDCCH"), Narrow Band Internet of Things ("NB-IoT"), Narrow Band-Physical Downlink Control Channel ("NPDCCH"), New Radio ("NR"), Physical Downlink Shared Channel ("PDSCH"), Time Division Duplex ("TDD"), Time-Division Multiplexing ("TDM"), Code-Division Multiplexing ("CDM"), User Entity/Equipment (remote device) ("UE"), Network Equipment ("NE"), Up Link ("UL"), Down Link ("DL"), Discontinuous Reception ("DRX"), low power wide area ("LPWA"), Paging Occasion ("PO"), wake-up signal ("WUS"), MTC wake-up signal ("MWUS"), System Information Block ("SIB"), Bandwidth Reduced Low Complexity/Coverage Enhancement ("BL/CE"), Internet of Things ("IoT"), Narrow Band Internet of Things ("NB-IoT"), Identification ("ID"), Evolved UMTS Terrestrial Radio Access Network ("E-UTRAN"), Non-Access Stratum ("NAS").

In wireless communication, such as a Third Generation Partnership Project ("3GPP") mobile network, various types of remote devices, also known as user equipment ("UE"), may be used. For example, Machine Type Communication ("MTC") UE may be used in addition to conventional types of terminal devices, such as mobile phones, smartphones, data modems, mobile computers, or the like.

MTC is expected to play an essential role within future 5G systems. It has been identified as an important use-case for 5G NR wireless technology. Applications of this type are characterized by huge volumes of end-points and connections, using low-cost devices and modules for wireless sensor networks, connected homes, smart metering and so on. It is expected that a new network is able to handle significantly more connections efficiently, which is prompting the development of new technologies to support Bandwidth Reduced Low Complexity/Coverage Enhancement (BL/CE) UEs.

MTC UEs typically transmit and receive only small amounts of data, which may occur more or less infrequently, e.g., once per week to once per minute. MTC UEs may also be polled for data, resulting in an irregular pattern of data transmission. MTC UEs are typically assumed to be autonomous sensor devices, alarm devices, actuator devices, remote control devices, or the like, which communicate with application servers, rather than being used for communication by a human user. Hence, this type of communication may also be referred to as machine-to-machine ("M2M") communication and the devices may be denoted as machine devices ("MDs"). MTC UEs are typically characterized by a modest bit rate and sparse communication. MTC UEs may therefore be implemented with low-performance data transmission capabilities. Further, MTC devices typically need to be very energy efficient.

NB-IoT is a standards-based low power wide area ("LPWA") technology developed to enable a wide range of new IoT devices and services. NB-IoT significantly improves the power consumption of user devices, system capacity and spectrum efficiency. More than 10 years of battery life can be supported for a wide range of use cases.

Discontinuous Reception ("DRX") is a known way of energy saving, which may be applied to MTC UEs. With DRX, a UE can enter an energy efficient sleep mode when no data transmission is needed. In the sleep mode, receiver circuitry of the UE may be turned off. DRX can be applied in connected mode, but also in idle mode, in which the UE only receives paging information on certain paging occasions. Paging information can be signaled to a UE to initiate a connection to a base station, also known as Network Equipment.

The wake-up signal ("WUS") is designed for the power saving. E-UTRAN uses WUS to indicate that the UE shall attempt to receive paging in that cell.

When the UE supports WUS and WUS configuration is provided in System Information, the UE shall monitor WUS using the WUS parameters provided in System Information. When DRX is used and the UE detects WUS, the UE shall monitor the following Paging Occasion ("PO"). When extended DRX is used and the UE detects WUS, the UE shall monitor the following numPOs or POs until a paging message including the UE's NAS identity is received, whichever is earlier. If the UE does not detect WUS, the UE is not required to monitor the following PO(s). Here, numPOs refers to the number of consecutive Paging Occasions mapped to one WUS provided in System Information where (numPOs≥1).

In the RAN 80 plenary meeting of 3GPP, new work items for Rel.16 MTC are approved. The objective is to specify improvements for machine-type communications BL/CE UEs, such as improved DL transmission efficiency and/or UE power consumption with support for UE group wake up signal.

SUMMARY

Methods and apparatuses for providing UE group wake up signals are disclosed. Several solutions are proposed to support wake up signals for group specific UEs.

In one embodiment, there is provided an apparatus comprising: a processor that determines a first time slot (w0) and a first frequency location for a first wake up signal; and a transmitter that transmits the first wake up signal starting from the first time slot (w0) and the first frequency location; wherein the first wake up signal is associated with a paging message and ends at a second time slot minus one (g0−1) with a first maximal duration; wherein a first time offset of the second time slot (g0) and a start of a time slot (k0) of the paging message is determined by at least one of: a second time offset of the second time slot (g0) to a third time slot (s0) for a second wake up signal, a second maximal duration of the second wake up signal, a presence of the second wake up signal, and a paged group number associated with the paging message; wherein the transmitter further transmits the paging message.

In some embodiments, the transmitter further transmits the second wake up signal from the third time slot (s0) and ends at a fourth time slot minus one (t0−1) with the second maximal duration.

In some embodiments, the first time offset is equal to the second time offset plus the second maximal duration of the second wake up signal and a third time offset of the fourth time slot (t0) to the start time slot (k0) of the paging message.

In some embodiments, the first time offset is equal to the third time offset of the fourth time slot (t0) to the start time slot (k0) of the paging message.

In some embodiments, the second time offset is determined by higher layers. In one embodiment, the second time offset may be fixed. In another embodiment, the second time offset may be determined by the third time offset and a scaling factor.

In some embodiments, the first wake up signal and the second wake up signal notify a terminal device to wake up to monitor the paging message.

In another embodiment, there is provided an apparatus comprising: a processor that determines a first time slot (w0) and a first frequency location for a first wake up signal; and a receiver that receives the first wake up signal starting from the first time slot (w0) and the first frequency location; wherein the first wake up signal is associated with a paging message and ends at a second time slot minus one (g0−1) with a first maximal duration; wherein a first time offset of the second time slot (g0) and a start of a time slot (k0) of the paging message is determined by at least one of: a second time offset of the second time slot to a third time slot for a second wake up signal, a second maximal duration of the second wake up signal, a presence of the second wake up signal, and a paged group number associated with the paging message; wherein the receiver further receives the paging message.

In some embodiments, the receiver further receives the second wake up signal from the third time slot and ends at a fourth time slot minus one with the second maximal duration.

In some embodiments, the first time offset is equal to the second time offset plus the second maximal duration of the second wake up signal and a third time offset of the fourth time slot to the start time slot of the paging message.

In some embodiments, the first time offset is equal to a third time offset of the fourth time slot to the start time slot of the paging message.

In some embodiments, the second time offset is determined by higher layers. In one embodiment, the second time offset may be fixed. In another embodiment, the second time offset may be determined by the third time offset and a scaling factor.

In some embodiments, the first wake up signal and the second wake up signal notify a terminal device to wake up to monitor the paging message.

In another embodiment, there is provided a method comprising: determining, by a processor, a first time slot and a first frequency location for a first wake up signal; transmitting, by a transmitter, the first wake up signal starting from the first time slot and the first frequency location; and transmitting, by the transmitter, the paging message; wherein the first wake up signal is associated with a paging message and ends at a second time slot minus one with a first maximal duration; wherein a first time offset of the second time slot and a start of a time slot of the paging message is determined by at least one of: a second time offset of the second time slot to a third time slot for a second wake up signal, a second maximal duration of the second wake up signal, a presence of the second wake up signal, and a paged group number associated with the paging message.

In some embodiments, it further comprises transmitting, by the transmitter, the second wake up signal from the third time slot (s0) and ends at a fourth time slot minus one (t0−1) with the second maximal duration.

In some embodiments, the first time offset is equal to the second time offset plus the second maximal duration of the second wake up signal and a third time offset of the fourth time slot (t0) to the start time slot (k0) of the paging message.

In some embodiments, the first time offset is equal to a third time offset of the fourth time slot (t0) to the start time slot (k0) of the paging message.

In some embodiments, the second time offset is determined by higher layers. In one embodiment, the second time offset may be fixed. In another embodiment, the second time offset may be determined by the third time offset and a scaling factor.

In some embodiments, the first wake up signal and the second wake up signal notify a terminal device to wake up to monitor the paging message.

In another embodiment, there is provided a method comprising: determining, by a processor, a first time slot and a first frequency location for a first wake up signal; receiving, by a receiver, the first wake up signal starting from the first time slot and the first frequency location; and receiving, by the receiver, the paging message; wherein the first wake up signal is associated with a paging message and ends at a second time slot minus one with a first maximal duration; wherein a first time offset of the second time slot and a start of a time slot of the paging message is determined by at least one of: a second time offset of the second time slot to a third time slot for a second wake up signal, a second maximal duration of the second wake up signal, a presence of the second wake up signal, and a paged group number associated with the paging message.

In some embodiments, it further comprises receiving, by the receiver, the second wake up signal from the third time slot and ends at a fourth time slot minus one with the second maximal duration.

In some embodiments, the first time offset is equal to the second time offset plus the second maximal duration of the second wake up signal and a third time offset of the fourth time slot to the start time slot of the paging message.

In some embodiments, the first time offset is equal to the third time offset of the fourth time slot to the start time slot of the paging message.

In some embodiments, the second time offset is determined by higher layers. In one embodiment, the second time offset may be fixed. In another embodiment, the second time offset may be determined by the third time offset and a scaling factor.

In some embodiments, the first wake up signal and the second wake up signal notify a terminal device to wake up to monitor the paging message.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
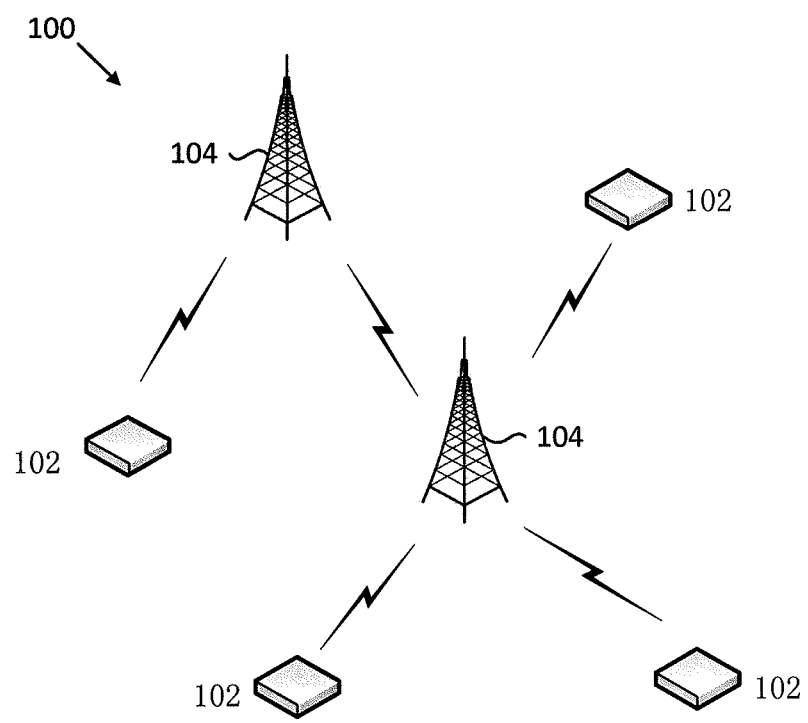
FIG. 1 is a schematic block diagram illustrating one embodiment of a wireless communication system.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 depicts an embodiment of a wireless communication system 100 for an MTC or NB-IoT network. In one embodiment, the wireless communication system 100 includes MTC UEs 102 and a network equipment 104. Even though a specific number of MTC UEs 102 and network equipment 104 are depicted in FIG. 1, one skilled in the art will recognize that any number of MTC UEs 102 and network equipment 104 may be included in the wireless communication system 100.

In one embodiment, the MTC UEs 102 may be autonomous sensor devices, alarm devices, actuator devices, remote control devices, or the like. The MTC UEs 102 may also be referred to as remote devices, subscriber units, terminals, mobile terminals, fixed terminals, subscriber stations, user equipment (UE), user terminals, a device, or by other terminology used in the art.

The network equipment 104 may be distributed over a geographic region. In certain embodiments, a network equipment 104 may also be referred to as an access point, an access terminal, a base, a base station, a Node-B, an eNB, a gNB, a Home Node-B, a relay node, a device, or by any other terminology used in the art. The network equipment 104 are generally part of a radio access network that includes one or more controllers communicably coupled to one or more corresponding network equipment 104. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with 3GPP 5G new radio (NR). More generally, however, the wireless communication system 100 may implement some other open or proprietary communication protocols.

The network equipment 104 may serve a number of MTC UEs 102 within a serving area, for example, a cell (or a cell sector) or more cells via a wireless communication link. The network equipment 104 transmit DL communication signals to serve the MTC UEs 102 in the time, frequency, and/or spatial domain.

Figure 2:
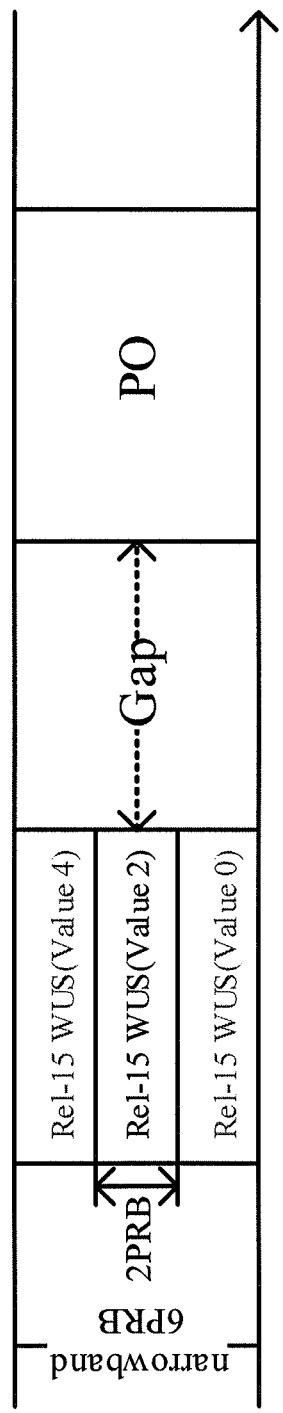
FIG. 2 is a schematic diagram illustrating cell-specific wake up signal scheme.

FIG. 2 is a schematic diagram illustrating cell-specific wake up signal scheme. This scheme is provided in 3GPP Rel.15 and is cell-specific. The MTC WUS ("MWUS") bandwidth is two consecutive Physical Resource Blocks ("PRBs"), and the frequency location of the lowermost PRB is signaled by higher layers. Value 0 corresponds to MWUS transmitted in the 1st and 2nd PRB, value 2 represents MWUS transmitted in the 3rd and 4th PRB, and value 4 represents MWUS transmitted in the 5th and 6th PRB.

For example, the frequency location of the lowermost PRB is 2, and such MWUS is shown in FIG. 2. The left 4 PRBs are not used for any transmission and WUS power can boosted with 6 dB within the narrowband. A particular narrowband has a bandwidth of 6 PRBs. In one embodiment, the network equipment always configures that only WUS is transmitted, which will achieve WUS power boosting from the other four "empty" PRBs.

As shown in FIG. 2, a gap period is defined as the end of the configured maximal WUS duration to the start of the associated PO. The gap is needed for the processing in the WUS detection, reducing the collision with other terminals, synchronization signal reception, and inner warming-up time of the baseband modules in the device modem used for the detection of the associated NPDCCH in PO.

In this cell-specific WUS scheme, if one UE associated to the paging occasion is paged, the WUS needs to be sent prior to the paging occasion, and then all UEs would wake up to monitor the MTC physical downlink control channel ("MPDCCH"). This will lead to unnecessary power consumption for other UEs due to unnecessary monitoring of MPDCCH even if there is no paging for that UE. It may be more efficient to wake up designated group of UEs in the network, i.e. using a UE group wake up signal scheme.

In the UE group wake up signal scheme according to one embodiment, the UEs in a network may be assigned to a number of groups which may be configured by SIB. The grouping of UEs may be based on UE IDs or certain functions of UE IDs. For each group of UEs, a UE group MWUS wakes up the UEs and may be assigned with a UE group ID. TDM, FDM and/or CDM may be used for UE group multiplexing.

If the UE group WUS is multiplexing with Rel.15 WUS with FDM, it will occupy the PRBs designed for power boosting, and thus the power boosting cannot be achieved, which will affect the performance of Rel.15 WUS.

Figure 3:
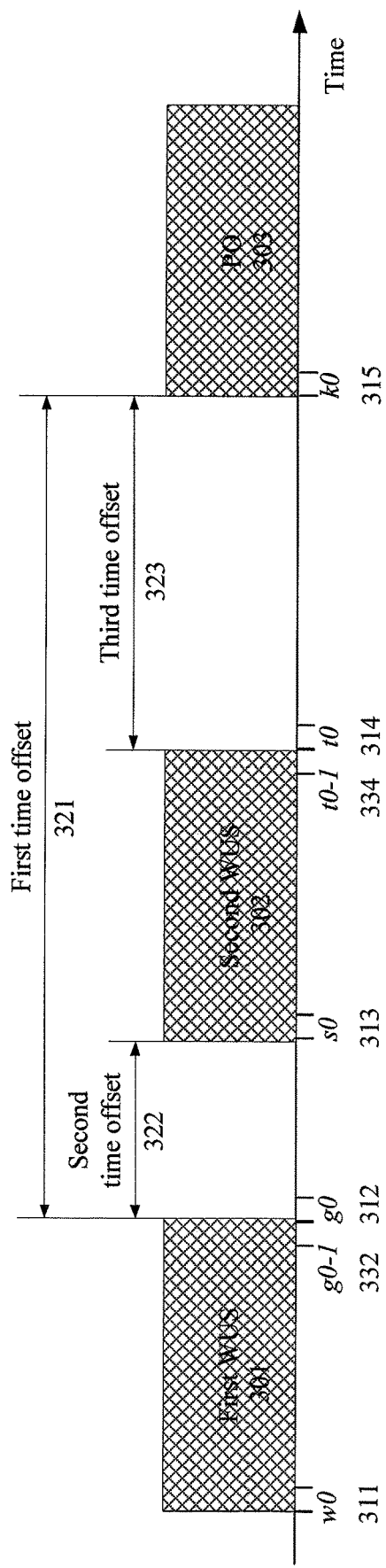
FIG. 3 is a schematic diagram illustrating time sequences in a UE group wake up signal scheme.

FIG. 3 is a schematic diagram illustrating time sequences in a UE group wake up signal scheme. This UE group wake up signal scheme is based on TDM with Rel.15 wake up signal scheme.

In one embodiment, there is provided an apparatus comprising: a processor that determines a first time slot (w0) 311 and a first frequency location for a first wake up signal 301; and a transmitter that transmits the first wake up signal 301 starting from the first time slot (w0) and the first frequency location; wherein the first wake up signal 301 is associated with a paging message 303 and ends at a second time slot minus one (g0−1) 332 with a first maximal duration; wherein a first time offset of the second time slot (g0) 312 and a start of a time slot (k0) of the paging message 315 is determined by at least one of: a second time offset 322 of the second time slot 312 to a third time slot (s0) 313 for a second wake up signal 302, a second maximal duration of the second wake up signal 302, a presence of the second wake up signal 302, and a paged group number associated with the paging message 303; wherein the transmitter further transmits the paging message.

Here, the time prior to the start time slot of paging message 315 includes four time slots: the first time slot (w0) 311, the second time slot (g0) 312, the third time slot (s0) 313 and the fourth time slot (t0) 314, as shown in FIG. 3. In some embodiments, the second WUS 302 is transmitted from the second time slot (g0) 312, which is shown in FIG. 3; while in some other embodiments, there is no transmission of the second WUS 302. The page group number may be a total number of groups of UEs that is to be paged.

In some embodiments, the first wake up signal 301 may be transmitted from the first time slot (w0) 311 and the first frequency location. The first time offset is defined as from a start of the second time slot (g0) to a start of the time slot (k0) of the paging message 315.

The second wake up signal 302 may be transmitted from the third time slot (s0) 313 and end at a fourth time slot minus one (t0−1) 334 with the second maximal duration. In this case, the first time offset 321 is equal to the second time offset 322 plus the second maximal duration of the second wake up signal 302 and a third time offset 323 of the fourth time slot (t0) 314 to the start time slot (k0) of the paging message 315.

In some other embodiments, there is no transmission of the second WUS 302. Thus, the first time offset 321 is equal to a third time offset 323 of the fourth time slot (t0) 314 to the start time slot (k0) of the paging message 315.

In some embodiments, the second time offset 322 is determined by higher layers. In one embodiment, the second time offset 322 may have a fixed value, such as 8 ms. In another embodiment, the second time offset 322 may be determined by the third time offset 323 and a scaling factor. The scaling factor may be determined by higher layer, for example, chosen from [1, ½, ¼]. In one example, the third time offset 323 may be 40 ms, the scaling factor may be ½, and consequently the second time offset 322 is 20 ms.

A skilled person would appreciate that other values of the third time offset may also be chosen, such as 10 ms, 20 ms, 80 ms, 100 ms, 240 ms, 1000 ms, 2000 ms, and etc.

In some embodiments, the first WUS 301 and the second wake up signal 302 notify a terminal device to wake up to monitor the paging message.

In some embodiments, the processor determines the paged group number associated with the paging message 303 and checks if the presence of the second wake up signal 302 is TRUE or FALSE.

If the paged group number associated with the paging message 303 is equal to 1, the first time offset 321 is equal to the second time offset 322 plus the second maximal duration of the second wake up signal 302 and a third time offset 323 of the fourth time slot (t0) 314 to the start time slot (k0) of the paging message 315.

If the paged group number associated with the paging message 303 is equal to 2, and the presence of the second wake up signal 302 is TRUE, the first time offset 321 is equal to the second time offset 322 plus the second maximal duration of the second wake up signal 302 and a third time offset 323 of the fourth time slot (t0) 314 to the start time slot (k0) of the paging message 315.

If the paged group number associated with the paging message 303 is equal to 2, and the presence of the second wake up signal 302 is FALSE, the first time offset 321 is equal to the second time offset 322 plus the second maximal duration of the second wake up signal 302 and a third time offset 323 of the fourth time slot (t0) 314 to the start time slot (k0) of the paging message 315.

If the paged group number associated with the paging message 303 is equal to 2, and the presence of the second wake up signal 302 is FALSE, The first time offset 321 is equal to a third time offset 323 of the fourth time slot (t0) 314 to the start time slot (k0) of the paging message 315.

If the paged group number associated with the paging message 303 is more than 2, the first time offset 321 is equal to the second time offset 322 plus the second maximal duration of the second wake up signal 302 and a third time offset 323 of the fourth time slot (t0) 314 to the start time slot (k0) of the paging message 315.

In some embodiments, the frequency location of the first wake up signal 301 is the same as a frequency location of the second wake up signal. The frequency location of the first wake up signal 301 is determined by a group ID and the frequency location of the second wake up signal.

The group ID maybe obtained based on the UE ID of the remote devices 102. Method of obtaining the group ID may be implemented with conventional or new hashing algorisms performed on the UE ID.

Figure 4A:
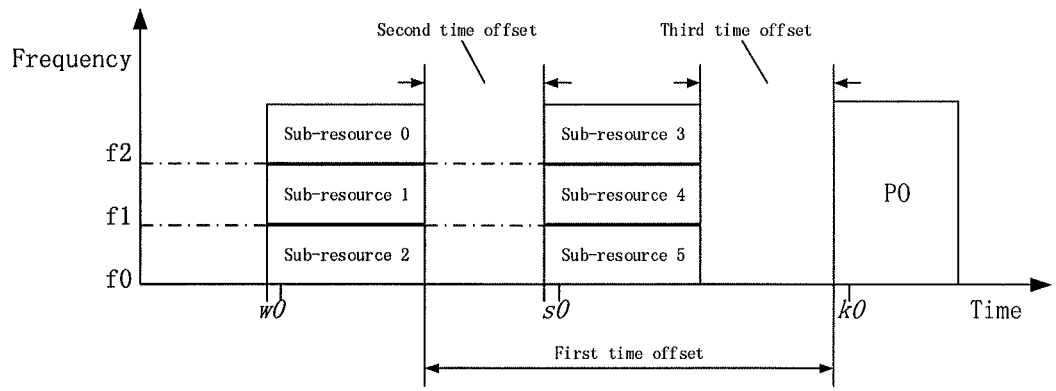
FIG. 4A is a schematic diagram illustrating resources in a UE group wake up signal scheme.

FIG. 4A is a schematic diagram illustrating resources in a UE group wake up signal scheme. Two time resources are defined prior to PO, each having three sub-sources for transmission of WUS. WUS bandwidth is two consecutive PRBs, and thus every narrowband can support at most three WUS transmissions.

Various types of WUS may be transmitted. The WUS may be categorized into the following categories and subcategories:
  a. Group based WUS
    i. Group specific WUS
    ii. Common group WUS
  b. Legacy WUS The group based WUS, or Rel.16 WUS, contains group information, which may be decoded by any group enabled UE. The group enabled UE, on receiving the group based WUS will decode the group information and compare with its own group ID. A match indicates that the UE is within the group associated the following paging message, and thus will monitor the paging occasion in the present paging cycle. Otherwise, it will not monitor the paging occasions in the present paging cycle.

The legacy WUS, or Rel.15 WUS, is compatible with Rel.15, and is thus able to be decoded by legacy UEs. A legacy UE, or Rel.15 UE, is a remote device that is incapable of decoding the group based WUS and/or incapable of identifying its own group ID.

The group specific WUS contains group information, and the group information notifies only a specified group of UEs, or a subset of the group enabled UEs, to monitor the following PO.

The common group WUS also contains group information, and the group information notifies all group enabled UEs, irrespective of which group they belong, to monitor the following PO. A common group WUS is one sequence that all UE groups need to detect for Rel.16 UE.

The following pseudo code provides a possible embodiment of how to determine the starting time slot for transmitting the UE group WUS:

---

1: if one UE group paged then
2:    UE group MWUS transmits from time slot w0

-continued

```
 3:   else two UE groups paged then
 4:     if Rel-15 UE paged then
 5:       the common MWUS transmits from time slot w0
 6:     else
 7:       one of UE group transmits from time slot w0
 8:       another UE group transmits from time slot s0
 9:     end if
10:   else
11:     the common WUS transmits from time slot w0
12:   end if
```

For legacy WUS, the frequency location of the lowermost PRB is signaled by higher layers. For the common group WUS, the frequency location of the lowermost PRB is same with the configuration for Rel.15 UE.

For group specific WUS, the frequency location of the lowermost PRB selects from [0, 2, 4] successively according to the UE group ID, starting with the configuration to Rel.15 UE.

In one embodiment, the arrangement of the WUS among the time and frequency sub-resources 0 to 5 in various scenarios may be determined based on the following table:

| Rel.16 UE groups | Rel.15 UE Paged | Rel.15 UE Not paged |
|---|---|---|
| UE group 1 | UE group 1 WUS transmits from time slot w0 and frequency location f1 | UE group 1 WUS transmits from time slot w0 and frequency location f1 |
| UE group 2 | UE group 2 WUS transmits from time slot w0 and frequency location f2 | UE group 2 WUS transmits from time slot w0 and frequency location f2 |
| UE group 3 | UE group 3 WUS transmits from time slot w0 and frequency location f0 | UE group 3 WUS transmits from time slot w0 and frequency location f0 |
| UE group 1, UE group 2 | the common WUS transmits from time slot w0 and frequency location f1 | UE group 1 WUS transmits from time slot w0 and frequency location f1 UE group 2 WUS transmits from time slot s0 and frequency location f2 |
| UE group 1, UE group 3 | the common WUS transmits from time slot w0 and frequency location f1 | UE group 1 WUS transmits from time slot w0 and frequency location f1 UE group 3 WUS transmits from time slot s0 and frequency location f0 |
| UE group 2, UE group 3 | the common WUS transmits from time slot w0 and frequency location f1 | UE group 2 WUS transmits from time slot w0 and frequency location f2 UE group 3 WUS transmits from time slot s0 and frequency location f0 |
| UE group 1, UE group 2, UE group 3 | the common WUS transmits from time slot w0 and frequency location f1 | the common WUS transmits from time slot w0 and frequency location f1 |

Figure 4B:
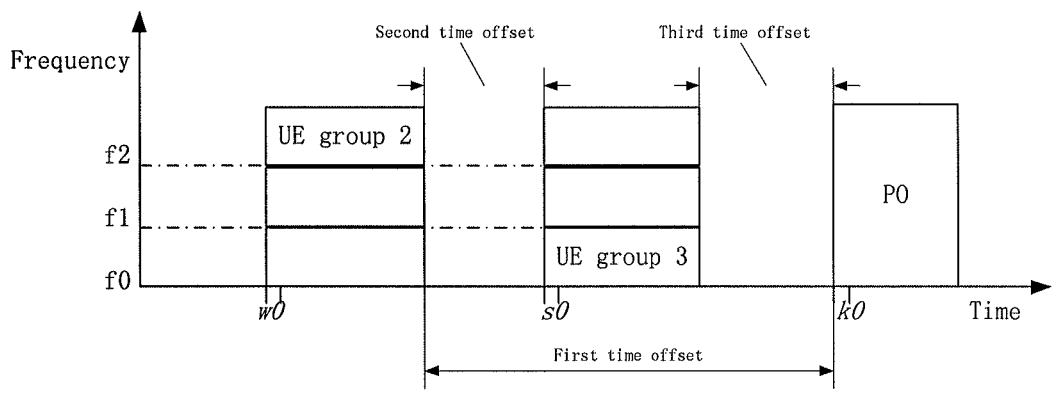
FIG. 4B is a schematic diagram illustrating one embodiment of the UE group wake up signal scheme of FIG. 4A.

FIG. 4B is a schematic diagram illustrating one embodiment of the UE group wake up signal scheme of FIG. 4A. In this embodiment, Rel.15 UE is not paged, while UE group 2 and UE group 3 of the Rel.16 UEs are paged. Here, UE group 2 WUS transmits from Sub-resource 0, namely time slot w0 and frequency location f2, while UE group 3 WUS transmits from Sub-resource 5, namely time slot s0 and frequency location f0.

Figure 4C:
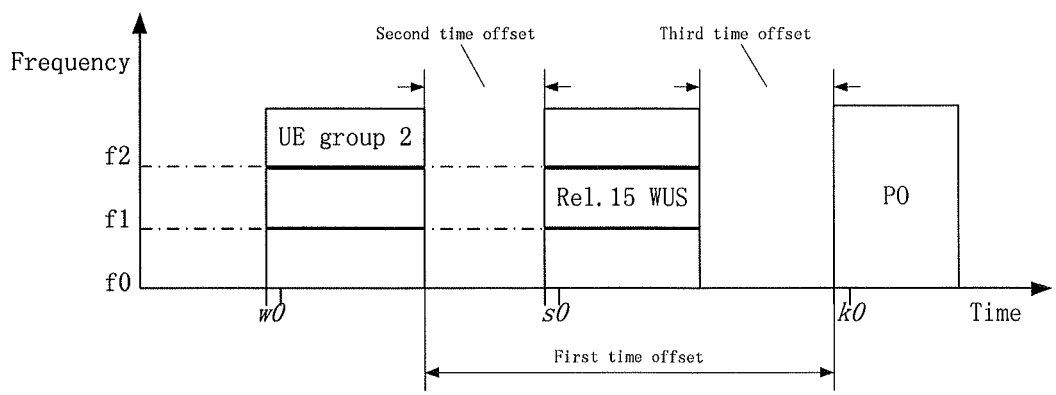
FIG. 4C is a schematic diagram illustrating another embodiment of the UE group wake up signal scheme of FIG. 4A.

FIG. 4C is a schematic diagram illustrating another embodiment of the UE group wake up signal scheme of FIG. 4A. In this embodiment, Rel.15 UE is paged, while UE group 2 of the Rel.16 UEs is paged. Here, UE group 2 WUS transmits from Sub-resource 0, namely time slot w0 and frequency location f2, while legacy WUS, or Rel.15 WUS, transmits from Sub-resource 4, namely time slot s0 and frequency location f1.

The arrangement above provides a potential solution on multiplexing Rel.16 WUSs with each other and/or with the legacy Rel.15 WUS.

One of the advantages of the arrangement is that it provides a flexible determination of how to transmit the UE group sequences. The location of the resources is determined by the number of the UE group paged and whether Rel.15 UE is paged.

Thus, it can guarantee that there are 4 PRBs left in the same narrowband. So although UE needs blind detection, it can use the same narrowband power for WUS power boosting as far as possible. In addition, it can reduce the WUS repetition number. This does not affect the Rel.15 WUS performance.

Figure 5A:
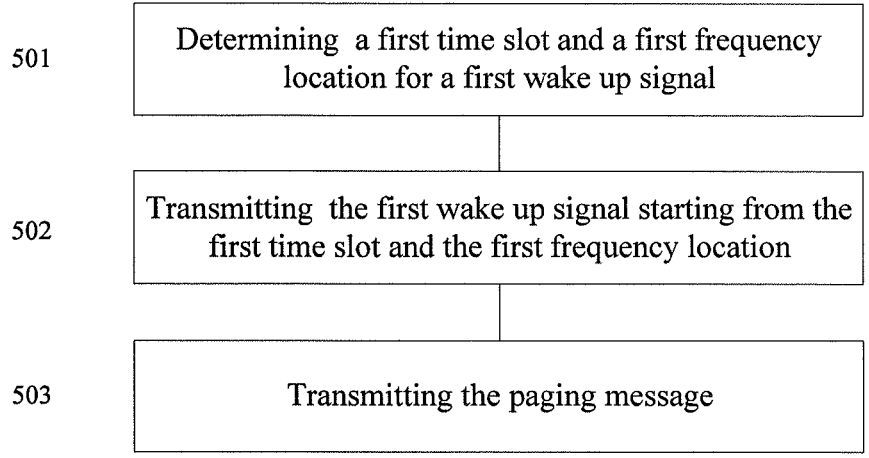
FIG. 5A is a flow diagram illustrating steps for transmitting UE group wake up signals.

FIG. 5A is a flow diagram illustrating steps for transmitting UE group wake up signals.

In step 501: a processor determines a first time slot and a first frequency location for a first wake up signal.

In step 502: a transmitter transmits the first wake up signal starting from the first time slot and the first frequency location.

In step 503: the transmitter transmits the paging message.

The first wake up signal is associated with a paging message and ends at a second time slot minus one 332 with a first maximal duration. A first time offset of the second time slot and a start of a time slot of the paging message is determined by at least one of: a second time offset of the second time slot to a third time slot for a second wake up signal, a second maximal duration of the second wake up signal, a presence of the second wake up signal, and a paged group number associated with the paging message.

Figure 5B:
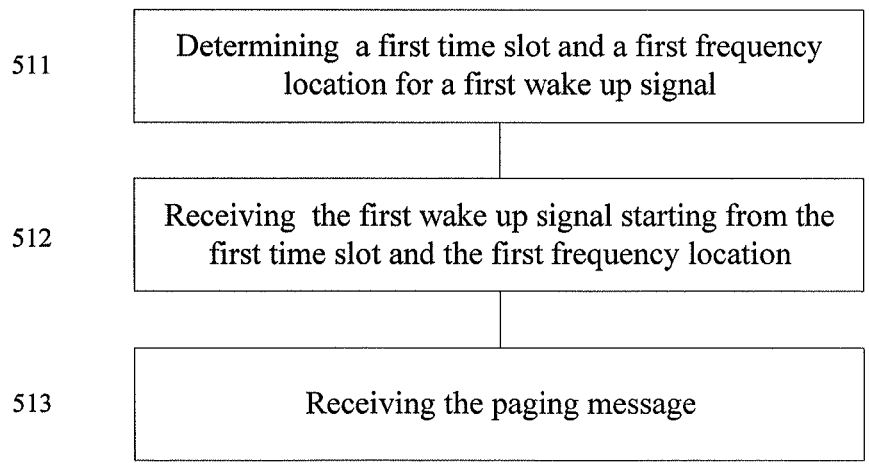
FIG. 5B is a flow diagram illustrating steps for receiving UE group wake up signals.

FIG. 5B is a flow diagram illustrating steps for receiving UE group wake up signals.

In step 511: a processor determines a first time slot and a first frequency location for a first wake up signal.

In step 512: a receiver receives the first wake up signal starting from the first time slot and the first frequency location.

In step 513: the receiver receives the paging message.

The first wake up signal is associated with a paging message and ends at a second time slot minus one with a first maximal duration. A first time offset of the second time slot and a start of a time slot of the paging message is determined by at least one of: a second time offset of the second time slot to a third time slot for a second wake up signal, a second maximal duration of the second wake up signal, a presence of the second wake up signal, and a paged group number associated with the paging message.

Figure 6:
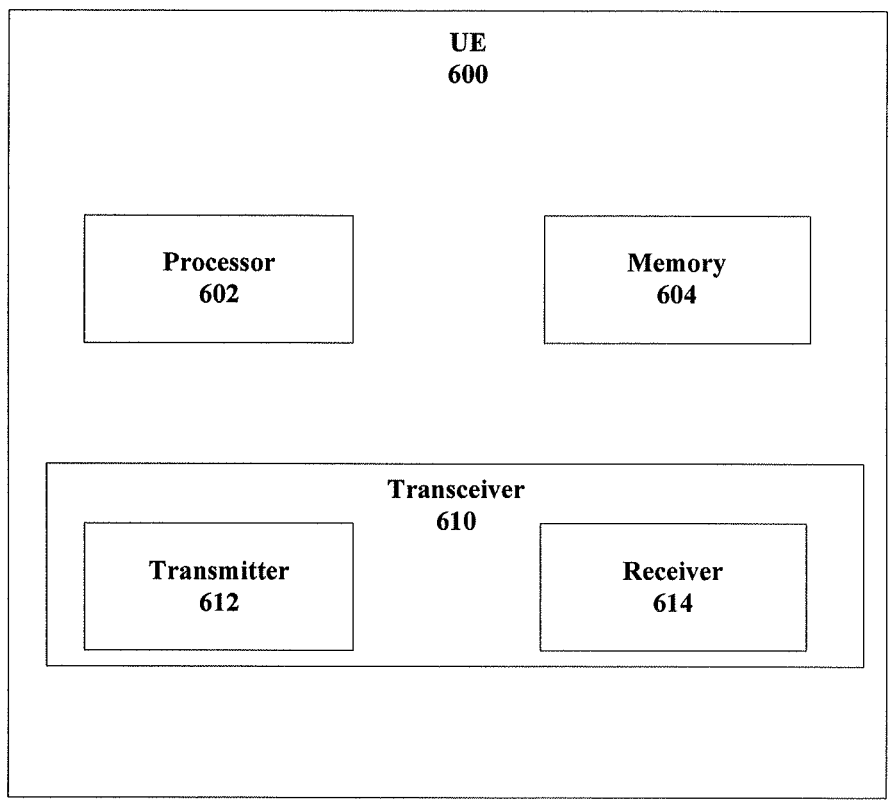
FIG. 6 is a schematic block diagram illustrating components of a UE according to one embodiment.

FIG. 6 is a schematic block diagram illustrating components of a UE according to one embodiment. The UE 600 may be an MTC remote device. The UE 600 may include a processor 602, a memory 604, and a transceiver 610.

The processor 602, in one embodiment, may include any known controller capable of executing computer-readable instructions and/or capable of performing logical operations. For example, the processor 602 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 602 executes instructions stored in the memory 604 to perform the methods and routines described herein. The processor 602 is communicatively coupled to the memory 604 and the transceiver 610.

In some embodiments, the processor 602 controls the transceiver 610 to receive various configuration and data from Network Equipment 700. The processor 602 may monitor the WUS received via the transceiver 610 and determines whether to monitor the paging message based on the WUS received.

The memory 604, in one embodiment, is a computer readable storage medium. In some embodiments, the memory 604 includes volatile computer storage media. For example, the memory 604 may include a RAM, including dynamic RAM ("DRAM"), synchronous dynamic RAM ("SDRAM"), and/or static RAM ("SRAM"). In some embodiments, the memory 604 includes non-volatile computer storage media. For example, the memory 604 may include a hard disk drive, a flash memory, or any other suitable non-volatile computer storage device. In some embodiments, the memory 604 includes both volatile and non-volatile computer storage media. In some embodiments, the memory 604 stores data relating to trigger conditions for transmitting the measurement report to Network Equipment 700. In some embodiments, the memory 604 also stores program code and related data.

The transceiver 610, in one embodiment, is configured to communicate wirelessly with Network Equipment 700. In certain embodiments, the transceiver 610 comprises a transmitter 612 and a receiver 614. The transmitter 612 is used to transmit UL communication signals to Network Equipment 700 and the receiver 614 is used to receive DL communication signals from Network Equipment 900. For example, the transmitter 612 may transmit a HARQ-ACK including feedbacks for one or more DL transmissions. As another example, the receiver 614 may receive various configurations/data from Network Equipment 700.

The transmitter 612 and the receiver 614 may be any suitable types of transmitters and receivers. Although only one transmitter 612 and one receiver 614 are illustrated, the transceiver 610 may have any suitable number of transmitters 612 and receivers 614. For example, in some embodiments, UE 600 includes a plurality of transmitter 612 and receiver 614 pairs for communicating on a plurality of wireless networks and/or radio frequency bands, each transmitter 612 and receiver 614 pair configured to communicate on a different wireless network and/or radio frequency band than the other transmitter 612 and receiver 614 pairs.

Figure 7:
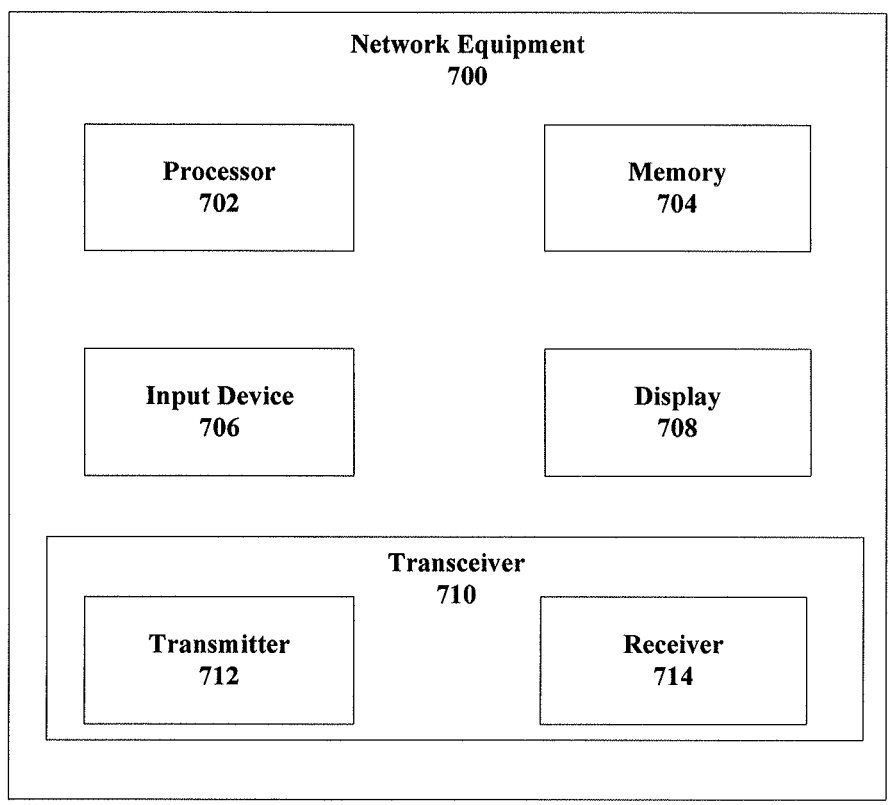
FIG. 7 is a schematic block diagram illustrating components of a network equipment according to one embodiment.

FIG. 7 is a schematic block diagram illustrating components of a network equipment according to one embodiment.

Network Equipment 700 includes one embodiment of eNB/gNB. Network Equipment 700 may include a processor 702, a memory 704, an input device 706, a display 708, and a transceiver 710.

In some embodiments, the processor 702 controls the transceiver 710 to transmit DL signals/data to UE 600. The processor 702 may also control the transceiver 710 to receive UL signals/data from UE 600. For example, the processor 702 may control the transceiver 710 to receive a HARQ-ACK including feedbacks for one or more DL transmissions. In another example, the processor 702 may control the transceiver 710 to transmit a DL signals for various configurations to UE 800, as described above.

The transceiver 710, in one embodiment, is configured to communicate wirelessly with UE 600. In certain embodiments, the transceiver 710 comprises a transmitter 712 and a receiver 714. The transmitter 712 is used to transmit DL communication signals to UE 600 and the receiver 714 is used to receive UL communication signals from UE 600. For example, the receivers 714 may receive a HARQ-ACK codebook from UE 600. As another example, the transmitter 712 may transmit the various configurations/data of Network Equipment 700.

The transceiver 710 may communicate simultaneously with a plurality of UE 600. For example, the transmitter 712 may transmit DL communication signals to UE 600. As another example, the receiver 714 may simultaneously receive UL communication signals from UE 600. The transmitter 712 and the receiver 714 may be any suitable types of transmitters and receivers. Although only one transmitter 712 and one receiver 714 are illustrated, the transceiver 710 may have any suitable number of transmitters 712 and receivers 714. For example, Network Equipment 700 may serve multiple cells and/or cell sectors, wherein the transceiver 710 includes a transmitter 712 and a receiver 714 for each cell or cell sector.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
determine a first time and a first frequency location for a start of a first wake up signal; and
receive the first wake up signal starting from the first time and the first frequency location; and
wherein the first wake up signal is associated with a paging message that occurs after a second wake up signal and the first wake up signal ends at a second time minus a duration, and the first wake up signal has a first maximal duration equal to the second time minus the duration minus the first time;
wherein a first time offset between the second time and a start time of the paging message is determined by:
a second time offset between the second time and a third time at which the second wake up signal starts; and
a paged group number associated with the paging message, wherein the paged group number comprises a total number of groups of UEs to be paged;
receive the paging message.

2. The UE of claim 1, wherein the at least one processor is configured to cause the UE to receive the second wake up signal starting from the third time and ending at a fourth time minus the duration, and the second wake up signal has a second maximal duration.

3. The UE of claim 2, wherein the first time offset is equal to the second time offset plus the second maximal duration of the second wake up signal and a third time offset between the fourth time and the start time of the paging message.

4. The UE of claim 2, wherein the second time offset is determined by higher layers, a third time offset, and a scaling factor, and the second time offset is fixed.

5. The UE of claim 1, wherein the first time offset is equal to a third time offset between a fourth time and the start time of the paging message.

6. The UE of claim 1, wherein the paged group number associated with the paging message is more than 2, the first time offset is equal to the second time offset plus a second maximal duration of the second wake up signal and a third time offset between a fourth time and the start time of the paging message.

7. The UE of claim 1, wherein the frequency location of the first wake up signal is the same as a frequency location of the second wake up signal; and the frequency location of the first wake up signal is determined by a group id and the frequency location of the second wake up signal.

8. A method performed by a base station, the method comprising:
- determining, by a processor, a first time slot and a first frequency location for a start of a first wake up signal;
- transmitting, by a transmitter, the first wake up signal starting from the first time slot and the first frequency location; and
- transmitting, by the transmitter, a paging message;
- wherein the first wake up signal is associated with the paging message that occurs after a second wake up signal and the first wake up signal ends at a second time minus a duration, and the first wake up signal has a first maximal duration equal to the second time minus the duration minus a first time;
- wherein a first time offset between the second time and a start time of the paging message is determined by:
  - a second time offset between the second time and a third time at which the second wake up signal starts; and
  - a paged group number associated with the paging message, wherein the paged group number comprises a total number of groups of user equipments (UEs) to be paged.

9. The method of claim 8, further comprising transmitting, by the transmitter, the second wake up signal starting from the third time and ending at a fourth time minus the duration, and the second wake up signal has a second maximal duration.

10. The method of claim 9, wherein the first time offset is equal to the second time offset plus the second maximal duration of the second wake up signal and a third time offset between the fourth time and the start time of the paging message.

11. The method of claim 9, wherein the second time offset is determined by higher layers, a third time offset, and a scaling factor, and the second time offset is fixed.

12. The method of claim 8, wherein the first time offset is equal to a third time offset between a fourth time and the start time of the paging message.

13. The method of claim 8, wherein the paged group number associated with the paging message is more than 2, the first time offset is equal to the second time offset plus a second maximal duration of the second wake up signal and a third time offset between a fourth time and the start time of the paging message.

14. The method of claim 8, wherein a frequency location of the first wake up signal is the same as a frequency location of the second wake up signal; and the frequency location of the first wake up signal is determined by a group id and the frequency location of the second wake up signal.

15. A method performed by a user equipment (UE), the method comprising:
- determining, by a processor, a first time slot and a first frequency location for a start of a first wake up signal;
- receiving, by a receiver, the first wake up signal starting from the first time slot and the first frequency location; and
- receiving, by the receiver, a paging message;
- wherein the first wake up signal is associated with the paging message that occurs after a second wake up signal and the first wake up signal ends at a second time minus a duration, and the first wake up signal has a first maximal duration equal to the second time minus the duration minus a first time;
- wherein a first time offset between the second time and a start time of the paging message is determined by:
  - a second time offset between the second time and a third time at which the second wake up signal starts; and
  - a paged group number associated with the paging message, wherein the paged group number comprises a total number of groups of UEs to be paged.

16. The method of claim 15, further comprising receiving, by the receiver, the second wake up signal starting from the third time and ending at a fourth time minus the duration, and the second wake up signal has a second maximal duration.

17. The method of claim 16, wherein the first time offset is equal to the second time offset plus the second maximal duration of the second wake up signal and a third time offset between the fourth time and the start time of the paging message.

18. The method of claim 16, wherein the second time offset is determined by higher layers, a third time offset, and a scaling factor, and the second time offset is fixed.

19. The method of claim 15, wherein the first time offset is equal to a third time offset between a fourth time and the start time of the paging message.

20. A base station, comprising:
- at least one memory; and
- at least one processor coupled with the at least one memory and configured to cause the base station to:
  - determine a first time slot and a first frequency location for a start of a first wake up signal;
  - transmit the first wake up signal starting from the first time slot and the first frequency location; and
  - transmit a paging message;
  - wherein the first wake up signal is associated with the paging message that occurs after a second wake up signal and the first wake up signal ends at a second time minus a duration, and the first wake up signal has a first maximal duration equal to the second time minus the duration minus a first time;
  - wherein a first time offset between the second time and a start time of the paging message is determined by:
    - a second time offset between the second time and a third time at which the second wake up signal starts; and
    - a paged group number associated with the paging message, wherein the paged group number comprises a total number of groups of user equipments (UEs) to be paged.

* * * * *